(12) United States Patent
Liu et al.

(10) Patent No.: US 9,349,186 B2
(45) Date of Patent: May 24, 2016

(54) SYSTEMS AND METHODS FOR IMAGE SEGMENTATION USING TARGET IMAGE INTENSITY

(71) Applicant: GENERAL ELECTRIC COMPANY, Schenectady, NY (US)

(72) Inventors: Xiaofeng Liu, Niskayuna, NY (US); John Frederick Schenck, Voorheesville, NY (US); Ek Tsoon Tan, Mechanicville, NY (US); Albert Amos Montillo, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 115 days.

(21) Appl. No.: 14/177,414

(22) Filed: Feb. 11, 2014

(65) Prior Publication Data

US 2014/0226889 A1    Aug. 14, 2014

Related U.S. Application Data

(60) Provisional application No. 61/763,153, filed on Feb. 11, 2013.

(51) Int. Cl.
*G06K 9/00* (2006.01)
*G06T 7/00* (2006.01)

(52) U.S. Cl.
CPC .............. *G06T 7/0081* (2013.01); *G06T 7/0087* (2013.01); *G06T 7/0089* (2013.01); *G06T 7/0097* (2013.01); *G06T 2200/04* (2013.01); *G06T 2207/10072* (2013.01); *G06T 2207/20076* (2013.01); *G06T 2207/20128* (2013.01); *G06T 2207/30016* (2013.01)

(58) Field of Classification Search
None
See application file for complete search history.

(56) References Cited

U.S. PATENT DOCUMENTS

| 8,160,357 B2* | 4/2012 | Akinyemi et al. | ............ 382/173 |
| 8,577,115 B2 | 11/2013 | Gering et al. | |
| 2012/0281900 A1 | 11/2012 | Rueckert et al. | |
| 2014/0056501 A1* | 2/2014 | Du et al. | ............ 382/131 |

FOREIGN PATENT DOCUMENTS

| EP | 1552531 B1 | 5/2013 |
| WO | 2006017233 A1 | 2/2006 |

OTHER PUBLICATIONS

Sabuncu, Mert R., et al. "A generative model for image segmentation based on label fusion." Medical Imaging, IEEE Transactions on 29.10 (2010): 1714-1729.*

(Continued)

*Primary Examiner* — Li Liu
(74) *Attorney, Agent, or Firm* — Melissa K. Dobson

(57) ABSTRACT

The system and method of the invention combines target image intensity into a maximum likelihood estimate (MLE) framework as in STAPLE to take advantage of both intensity-based segmentation and statistical label fusion based on atlas consensus and performance level, abbreviated iSTAPLE. The MLE framework is then solved using a modified expectation-maximization algorithm to simultaneously estimate the intensity profiles of structures of interest as well as the true segmentation and atlas performance level. The iSTAPLE greatly extends the use of atlases such that the target image need not have the same image contrast and intensity range as the atlas images.

13 Claims, 5 Drawing Sheets

(56) References Cited

OTHER PUBLICATIONS

Sdika, Michaël. "Combining atlas based segmentation and intensity classification with nearest neighbor transform and accuracy weighted vote." Medical Image Analysis 14.2 (2010): 219-226.*

Lötjönen, Jyrki MP, et al. "Fast and robust multi-atlas segmentation of brain magnetic resonance images." Neuroimage 49.3 (2010): 2352-2365.*

Artaechevarria, Xabier, Arrate Munoz-Barrutia, and Carlos Ortiz-de-Solórzano. "Combination strategies in multi-atlas image segmentation: Application to brain MR data." Medical Imaging, IEEE Transactions on 28.8 (2009): 1266-1277.*

Warfield, Simon K., Kelly H. Zou, and William M. Wells. "Simultaneous truth and performance level estimation (STAPLE): an algorithm for the validation of image segmentation." Medical Imaging, IEEE Transactions on 23.7 (2004): 903-921.*

Asman et al.,"Non-Local STAPLE: An Intensity-Driven Multi-Atlas Rater Model", Med Image Comput Comput Assist Interv., vol. 15, p. 426-434, 2012.

Hao et al., "Local Label Learning (L3) for Multi-Atlas based Segmentation", Proc. SPIE 8314, Medical Imaging 2012: Image Processing, Feb. 23, 2012.

Wang H et al., "Multi-Atlas Segmentation with Joint Label Fusion.", IEEE Trans Pattern Anal Mach Intel!, Jun. 22, 2012.

Commowick O, "Estimating a reference standard segmentation with spatially varying performance parameters: local MAP STAPLE.", IEEE Trans Med Imaging, vol. 31, Issue 8, p. 1593-1606, Aug. 31, 2012.

Liu et al., "iSTAPLE: improved label fusion for segmentation by combining STAPLE with image intensity", Proc. SPIE 8669, Medical Imaging 2013: Image Processing, Mar. 13, 2013.

Akhondi-Asl, "Simultaneous Truth and Performance Level Estimation Through Fusion of Probabilistic Segmentations", Medical Imaging, IEEE Transactions on, vol. 32, Issue 10, p. 1840-1852, Oct. 2013.

* cited by examiner

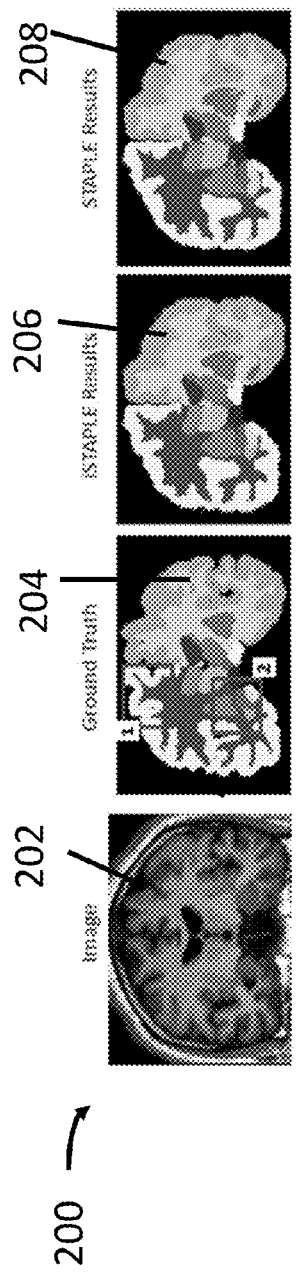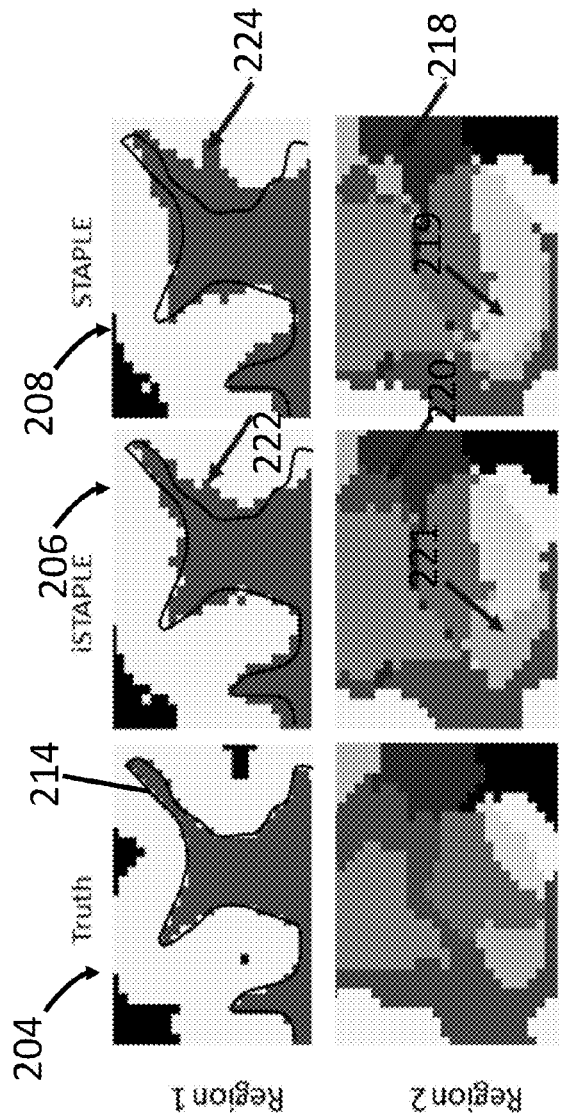

SYSTEMS AND METHODS FOR IMAGE SEGMENTATION USING TARGET IMAGE INTENSITY

FIELD

Embodiments relate generally to image segmentation, and more particularly to, identifying regions of interest for use in medical image analysis.

BACKGROUND

Image segmentation is often used to identify regions of interest for use in medical image analysis. In particular, image segmentation is used to segment structures from the background and is often used as a first step for medical image analysis, such as for visualization, quantitative image analysis, and image guided intervention.

Image segmentation can be difficult to perform because of the large variability of shape and appearance of different structures, including the lack of contrast between adjacent or neighboring structures. Known image segmentation methods are generally divided into local image-based approaches and atlas-based approaches. For example, image-based approaches segment based on image cues including intensity, gradient, and/or texture. Image based methods use different models that perform generally well when structures of interest have prominent boundaries and the intensities of neighboring structures are different. However, these methods often perform poorly when these conditions are not met. While prior anatomical knowledge might help alleviate such limitations it is difficult to incorporate this information into image-based approaches especially information about multi-structure segmentation.

Atlas-based approaches rely largely on prior knowledge about the spatial arrangement of structures. These approaches typically include first registering one or more of the images (atlases) to the subject image target, so that the manual segmentations from the atlas(es) can be propagated and fused. Compared to image-based approaches, these methods incorporate anatomical knowledge for improved performance, but are limited by large anatomical variation and imperfect registration.

Multi-atlas based methods have been a trend for robust and automated image segmentation. In general, these methods first transfer prior manual segmentations, i.e. label maps, on a set of atlases to a given target image through image registration. The multiple label maps are then fused together to produce segmentations of the target image, by way of two utilized fusion strategies through voting strategy or statistical fusion, e.g. Simultaneous Truth and Performance Level Estimation ("STAPLE"), an algorithm for the validation of image segmentation. Different from most voting-based methods, STAPLE does not assume the atlases perform equally well on the target image. Instead, the atlas labeling performance levels for the structures of interest are modeled and incorporated into a probabilistic framework which is solved for the true segmentation. STAPLE simultaneously estimates the true segmentation and the label map performance level, but has been shown inaccurate for multi-atlas segmentation because it is determined on propagated label maps and not on the target image intensity. This makes STAPLE more robust to anatomical variation between the atlas images and the target image, advantageous over majority voting. STAPLE (as well as voting strategy), however, blindly fuses the labels without considering target image intensity information, permitting errors especially at the region boundaries.

In further explanation, STAPLE fuses labels based on the propagated atlas labels without considering the target image. Therefore, when the target image exhibits large anatomical variation from the atlas images, the registration step may consistently fail on certain structures and STAPLE will not work. In addition, STAPLE is less accurate along structure boundaries.

Weighted fusion methods have also been proposed to improve performance where the segmentation fusion is weighted based on the intensity similarity between the target and the atlas images. However, information about structure intensity and contour that is specific to the subject's anatomy is not used, which makes it difficult to apply these methods to subjects with large anatomical differences from the atlases. Other methods have also been proposed and include an adaptive atlas method that allows large structure variation based on target image intensities. However, adaptive atlas methods do not consider structure boundary information, which means these methods cannot discriminate different structures that have similar intensities. Still other proposed methods use spectral label fusion that divides the target image into regions based on image intensities and contours, followed by voting on the regions using an atlas-based approach. These methods, however, are usually limited to a single anatomical region and would be difficult to extend to segment multiple regions simultaneously.

Thus, known segmentation methods suffer from different drawbacks as a result of using such image-based approaches or atlas-based approaches. Characterizing the performance of image segmentation poses an ongoing challenge, especially given the limited accuracy and precision during segmentation. Furthermore, interactive drawing of desired segmentation by human raters and performance by algorithmic raters creates unknown variability, performance of which is difficult to quantify because of the difficulty in obtaining or estimating a known true segmentation for clinical data. The following sets forth a new method and system that addresses these deficiencies.

SUMMARY

In one embodiment, a non-transitory computer readable storage medium for segmenting an image using a processor is provided. The non-transitory computer readable storage medium includes instructions to command the processor to obtain one or more target images, obtain one or more propagated label probabilities for the one or more target images, and segment the one or more target images using a cost function of a deformable atlas model. The non-transitory computer readable storage medium further includes instructions to command the processor to identify segmented structures within the one or more target images based on the segmented target images.

Embodiments disclosed include a non-transitory computer readable storage medium for segmenting an image using a processor, the non-transitory computer readable storage medium including instructions to command the processor to: obtain a plurality of weighted images, reserving at least one weighted image as a target image, and using a remaining portion of the plurality of weighted images as atlas images in a multi-atlas segmentation; provide at least one set of labels per atlas image wherein the labels are in an image-space of the target image; register the atlas images to the target image by aligning the labels in the image-space of the target image; and create one or more sets of a segmented target image by way of label fusion using intensity data of segmented structures defined therein.

In one aspect, the non-transitory computer readable storage medium registers the atlas images to the target image using symmetric diffeomorphic normalization (SyN) methods in Advanced Normalization Tools (ANTs). In another aspect, the non-transitory computer readable storage medium provides instructions to utilize intensity-based simultaneous truth and performance level estimation (iSTAPLE). Any class of registration may be utilized, however, without limitation, including linear and non-linear based registration, deformable, volume-based, landmark-based, among others.

Embodiments herein may vary in scope to include multi-atlas based methods that facilitate automated image segmentation. Multiple label maps are fused together to produce segmentations of the target image through voting strategy or statistical fusing, while simultaneously considering the target image intensity. Such embodiments can be modified to estimate intensity profiles of structures of interest as well as the true segmentation and atlas performance level.

BRIEF DESCRIPTION OF THE DRAWINGS

FIG. 2 demonstrates whole-brain segmentation in one embodiment:

FIG. 2A illustrates from left to right (i) one coronal slice of the T1 weighted image, (ii) the ground truth, (iii) the segmentation results of iSTAPLE, and (iv) the segmentation results of STAPLE.

FIG. 2B illustrates the ground truth, iSTAPLE results, and STAPLE results on the two zoomed regions (1) and (2) as labeled in FIG. 2A.

DETAILED DESCRIPTION

Figure 1:
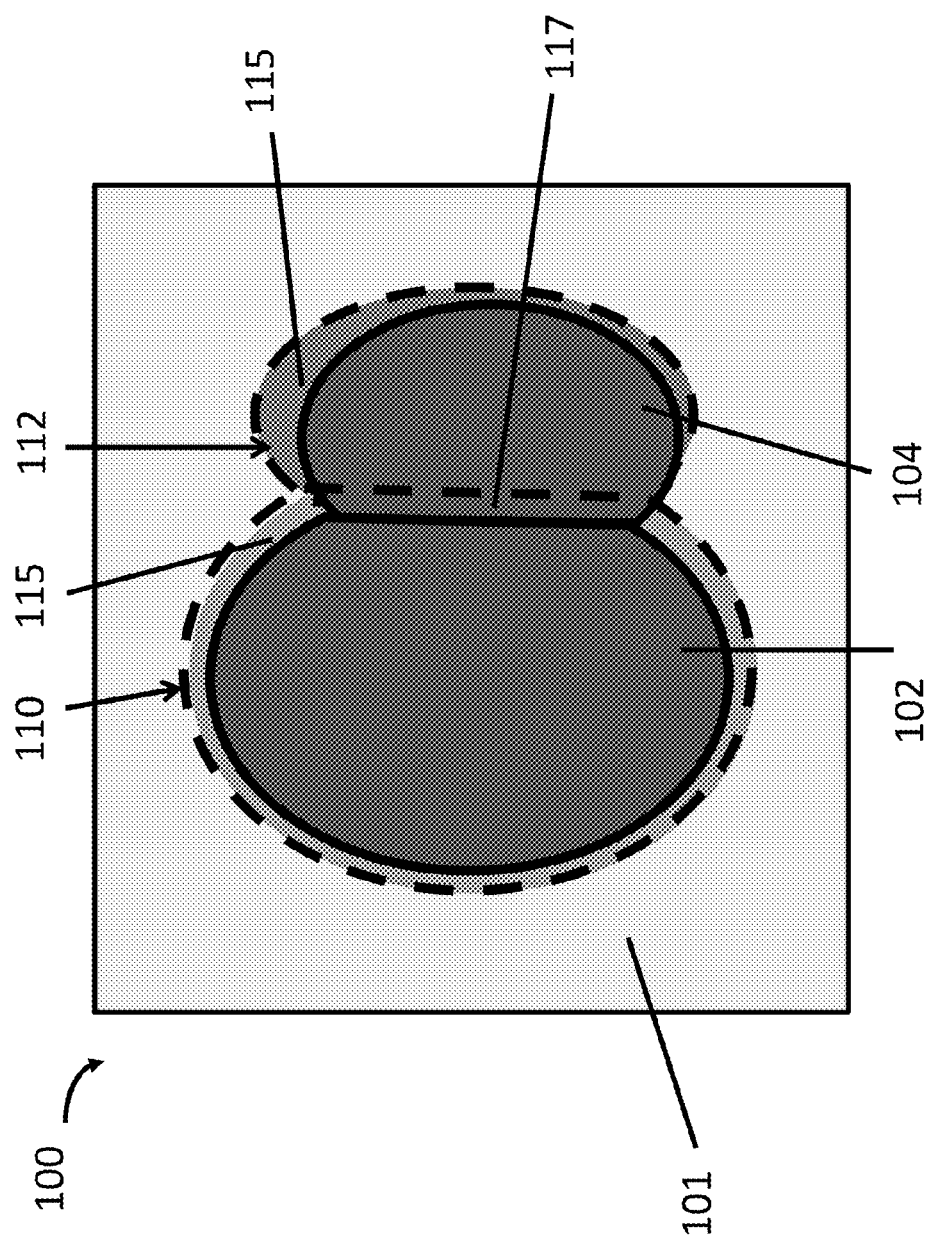
FIG. 1 is an illustration of the invention incorporating the target intensity image in accordance with one embodiment.

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers, or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules or units shown in the attached figures may represent the hardware that operates based on software or hardwired instructions, the software that directs hardware to perform the operations, or a combination thereof.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide systems and methods for single and multi-structure segmentation. In particular, an embodiment discloses the use of Intensity Simultaneous Truth and Performance Level Estimation ("iSTAPLE") that combines target image intensity into a maximum likelihood estimate (MLE) framework, as used in STAPLE, to take advantage of both intensity-based segmentation and statistical label fusion based on atlas consensus and performance level. The MLE framework is then solved using a modified Expectation-Maximization (EM) algorithm to simultaneously estimate the intensity profiles of structures of interest as well as the true segmentation and atlas performance level. Unlike other methods, iSTAPLE does not require the target image to have the same image contrast and intensity range as the atlas images, which greatly extends the use of atlases.

Various embodiments of the invention provide a set of atlases, each of which includes a structural image and a corresponding manual segmentation of structures of interest. An atlas comprises a subject's intensity image and its manually segmented label mask. The target image to be segmented, can be acquired with different imaging parameters than the atlas images, and even the atlas images can have different intensity profiles. Thus, the methods employed in the invention use the target intensity image in the MLE framework. Typically, the methods first register the atlas images to the target image, propagate the manual segmentations, or labels, by applying the computed transformation, and then generate the segmentation results on the target image by fusing the propagated labels from the atlases.

The label fusion method, iSTAPLE, extends STAPLE by incorporating the target intensity image into conventional STAPLE framework. As shown in FIG. 1, an image 100 depicts two touching structures 102, 104 with similar corresponding intensities on a background 101. Because of imperfect registration, the transformed label maps 106, 108 (respectively) do not completely align with the actual structures 102, 104. Note: The outermost perimeter/boundary of the left structure and the outermost perimeter of the right structure are designated by dotted lines 110, 112, respectively). The mis-labeled regions 115 around the boundaries with background have different intensity values and are corrected based on image intensity; while the boundary between the two mislabeled central regions 117 are determined based on atlas consensus and performances using label fusion, i.e. STAPLE.

Based on this observation, the iSTAPLE method integrates takes advantage of both intensity-based segmentation and STAPLE label fusion. Moreover, iSTAPLE integrates into the MLE framework the intensity information based solely on the target image, negating the use or atlas images in label fusion and allowing application of multi-atlas segmentation methods to images with different modalities from the atlas images. For exemplary purposes, and not limitation, experiments on whole brain segmentation have shown that iSTAPLE is more robust and produces better results that current segmentation methodologies.

The iStaple Method

As illustrated in FIG. 1, segmentation results along tissue boundaries are improved while compensating for anatomical variation using the structure appearance information in the target image via the iSTAPLE method. The iSTAPLE method extends STAPLE by taking into account the target intensity image I and incorporating it into a probabilistic framework solved in a modified Expectation-Maximization (EM) algorithm for multi-structure segmentation.

Assuming I is independent to atlas labels D and performance parameters θ, the log likelihood function for iSTAPLE is expressed as:

$$\log f(D,T,I|\theta) = \log f(D|T,I,\theta) f(I|T) f(T) \quad \text{Equation 1}$$

wherein I is the target intensity image, D is the propagated sets of atlas labels in the target image space, T is the true label(s) on the target image, and θ is the set of parameters, including the performance level parameters and parameters for target structure intensity distributions.

The conditional expectation function for iSTAPLE at iteration t is then:

$$Q(\theta|\theta^{(t)}) = E[\log f(D, T, I|\theta) | D, I, \theta^{(t)}] \quad \text{Equation 2}$$

$$= \sum_T \log[f(D|T, I, \theta) f(I|T) f(T)]$$

$$f(T|D, I, \theta^{(t)})$$

Since propagated atlas label D is independent to the target image I, the conditional probability is written as:

$$f(T|D, I, \theta^{(t)}) = \frac{f(D|T, \theta^{(t)}) f(I|T) f(T)}{\sum_{T'} f(D|T', \theta^{(t)}) f(I|T') f(T')} \quad \text{Equation 3}$$

In the E-step, the weight function at voxel for iSTAPLE is written as:

$$W_{si}^{(t)} = \frac{f(T_i=s) f(I_i|T_i=s) \prod_j f(D_{ij}|T_i=s, \theta_j^{(t)})}{\sum_{s'} f(T_i=s') f(I_i|T_i=s') \prod_j f(D_{ij}|T_i=s', \theta_j^{(t)})} \quad \text{Equation 4}$$

The new term defining the intensity distribution, $f(I_i|T_i=s)$, as compared to the STAPLE method, models the probability that a voxel that belongs to the $s^{th}$ structure has an intensity of $I_i$. This enables iSTAPLE to take advantage of appearance differences of different structures and results in more accurate segmentation along structure boundaries and in cases of large anatomical variation. For neighboring structures with similar intensity distributions, $W_{si}^{(t)}$ is largely determined by the atlas consensus and performance parameters, as similar in conventional STAPLE.

Here, the intensity distribution $f(I_i|T_i=s)$, is modeled using Gaussian function. For exemplary purposes, and not limitation, shown as follows:

$$f(I_i|T_i=s) = \frac{1}{\sqrt{2\pi\sigma_s^{2(t)}}} e^{-\frac{(I_i-\mu_s^{(t)})^2}{2\sigma_s^{2(t)}}}, \quad \text{Equation 5}$$

where $\mu_s^{(t)}$ and $\sigma_s^{2(t)}$ are the mean and variance of the target image for structure s, respectively.

In the M-step, the parameters, $\theta^{(t)}$, $\mu_s^{(t)}$, and $\sigma_s^{2(t)}$, are computed by maximizing the conditional expectation function shown in Equation 2 above;

$\theta^{(t)}$ is estimated as in the STAPLE method:

$$\theta_{js's}^{(t+1)} = \frac{\sum_{i:D_{ij}=s'} W_{si}^{(t)}}{\sum_i W_{si}^{(t)}} \quad \text{Equation 6}$$

$\mu_s^{(t)}$, and $\sigma_s^{2(t)}$ are computed by:

$$(\mu_s^{(t)}, \sigma_s^{2(t)}) = \operatorname*{argmax}_{\mu_s, \sigma_s} \sum_i W_{si}^{(t)} \log f(I_i|T_i=s) \quad \text{Equation 7}$$

Thus, the following results:

$$\mu_s^{(t)} = \frac{\sum_i W_{si}^{(t)} I_i}{\sum_i W_{si}^{(t)}}, \quad \text{Equation 8}$$

$$\sigma_s^{2(t)} = \frac{\sum_i W_{si}^{(t)} (I_i - \mu_s^{(t)})^2}{\sum_i W_{si}^{(t)}} \quad \text{Equation 9}$$

In summary, the iSTAPLE algorithm, as implemented into the system, can be characterized by the following steps:
(1) Set k=0. Initialize $\theta^{(0)}$. Initialize $W_{si}^{(0)}$ as in Equation 4 above by assuming $f(I_i|T_i=s)=1$.
(2) Compute $\theta^{(k+1)}$ using Equation 6.
(3) Compute $\mu_s^{(k+1)}$ and $\sigma_s^{(k+1)}$ using Equations 8 and 9, respectively.
(4) Compute $W_{si}^{(t)}$ using Equation 4.
(5) Iterate steps 2-4 until the algorithm converges or reaches a specified number of iteration (as determined by a user).

In one embodiment, the iSTAPLE method is used on whole brain segmentation using Internet Brain Segmentation Repository (IBSR) atlases. The IBSR comprises 18 healthy subjects with T1 weighted images; 32 brain structures are manually delineated on each image by experts and serve as ground truth. In one method, leave-one-out experiments are performed for cross-validation. In one aspect, one image is selected as the target image, and the remaining 17 data images are used as the atlases in the multi-atlas segmentation.

For each experiment, the atlas images are registered to the target image using Symmetric Diffeomorphic Normalization (SyN) method in Advanced Normalization Tools (ANTs), and the labels in the atlases are propagated to the target image domain. After that, the target image is segmented through label fusion with both iSTAPLE and convention STAPLE methods. The segmentation results are then compared to the ground truth using the Dice coefficient, i.e.

$$\mu_s^{(t)} = \frac{\sum_i W_{si}^{(t)} I_i}{\sum_i W_{si}^{(t)}}, \quad \text{Equation 8}$$

$$\sigma_s^{2(t)} = \frac{\sum_i w_{si}^{(t)}(I_i - \mu_s^{(t)})^2}{\sum_i w_{si}^{(t)}}$$ Equation 9 where X is the voxel set of ground truth, Y is the voxel set of the segmentation result, and |.| is the set cardinality.

FIG. 2 shows the segmentation results on whole-brain segmentation on one IBSR dataset 200. Visually, iSTAPLE provides improved segmentation of the boundaries between adjacent structures as compared to conventional STAPLE. In FIG. 2A, from left to right, one coronal slice 202 of the T1 weighted image is shown, followed by the ground truth 204, the segmentation results of iSTAPLE 206, and the segmentation results of STAPLE 208. FIG. 2B illustrates the ground truth, iSTAPLE results, and STAPLE results on two zoomed regions that are labeled in FIG. 2A respectively, Region 1 and Region 2. For Region 1, the white matter contour 214 is drawn on the ground truth 204 and overlayed on iSTAPLE results 206 and STAPLE results 208 to show the differences. Improved segmentation (e.g. 218, 219, 220, 221) and boundary delineation (e.g. 222, 224) are seen in the majority of structures (as depicted by arrows).

Figure 3:
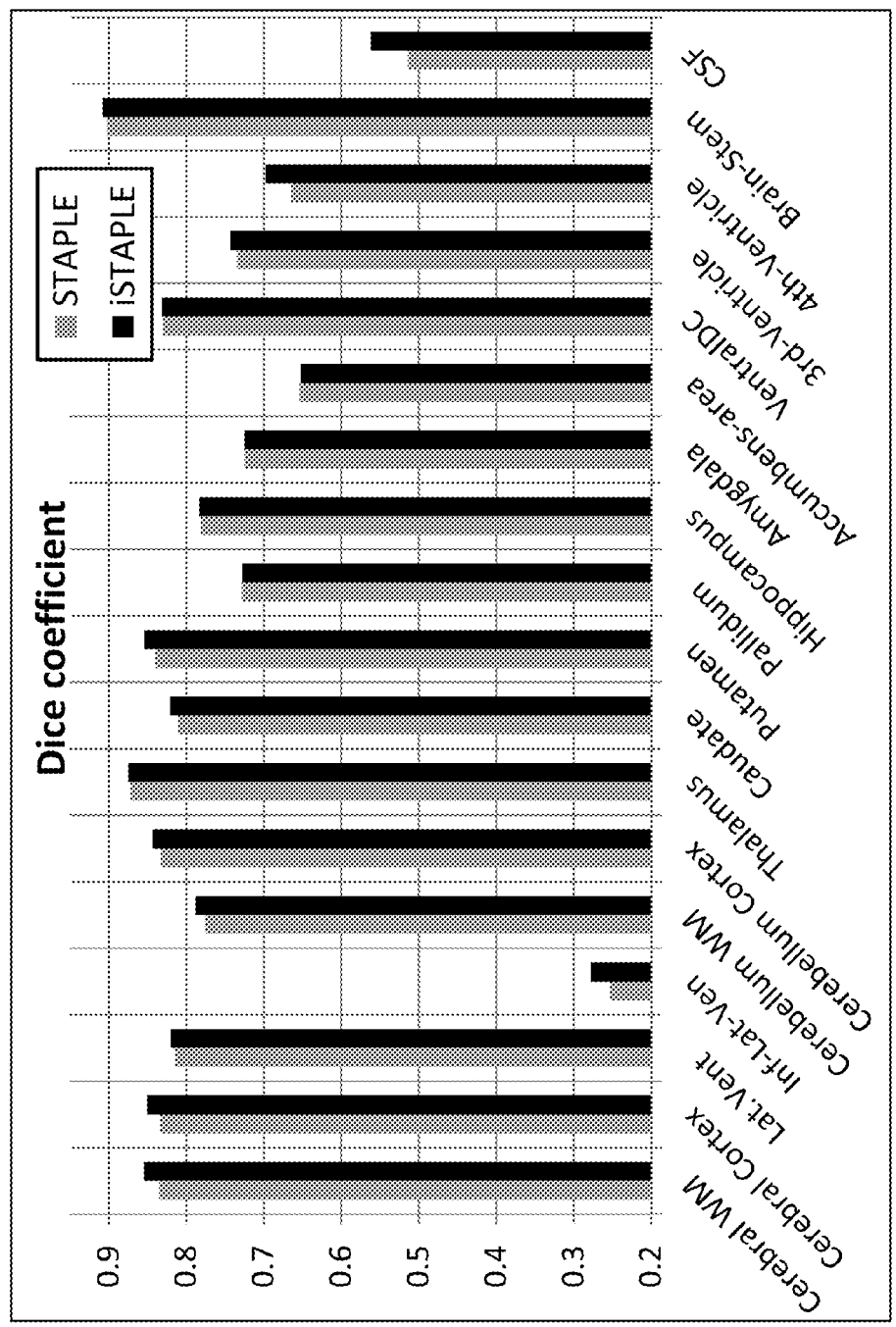
FIG. 3 depicts the mean Dice coefficients of STAPLE and iSTAPLE methods on different brain structures in accordance with embodiments of the invention.

The mean Dice coefficients for the 18 experiments on the 32 brain structures are shown in FIG. 3 for quantitative comparison. Here, the results on the same structure at the left and right sides are shown together. Overall, iSTAPLE outperformed STAPLE methods especially on structures whose intensity distributions are different from their neighboring structures, e.g., ventricles and cortex. For subcortical structures (e.g., thalamus, caudate, puttaman, hippocampus, and amygdala), iSTAPLE performed slightly better, but with limitations where the intensity distributions are close to their neighboring structures and thus intensity information for these structures is less effective.

In one aspect, the Dice similarity coefficient (DSC) is used as a statistical validation metric to evaluate the performance of both reproducibility of manual segmentations and the spatial overlap accuracy of automated probabilistic fractional segmentation of magnetic resonance (MR) images. Other statistical metrics may be utilized as well to evaluate and prove the advantages of iSTAPLE as shown herein.

At least one technical effect of various embodiments is improved image segmentation over conventional image-based or atlas-based segmentation methods. At least one technical effect of various embodiments is improved segmentation performance around the structure boundaries and a more robust segmentation for large anatomical variation.

Figure 4:
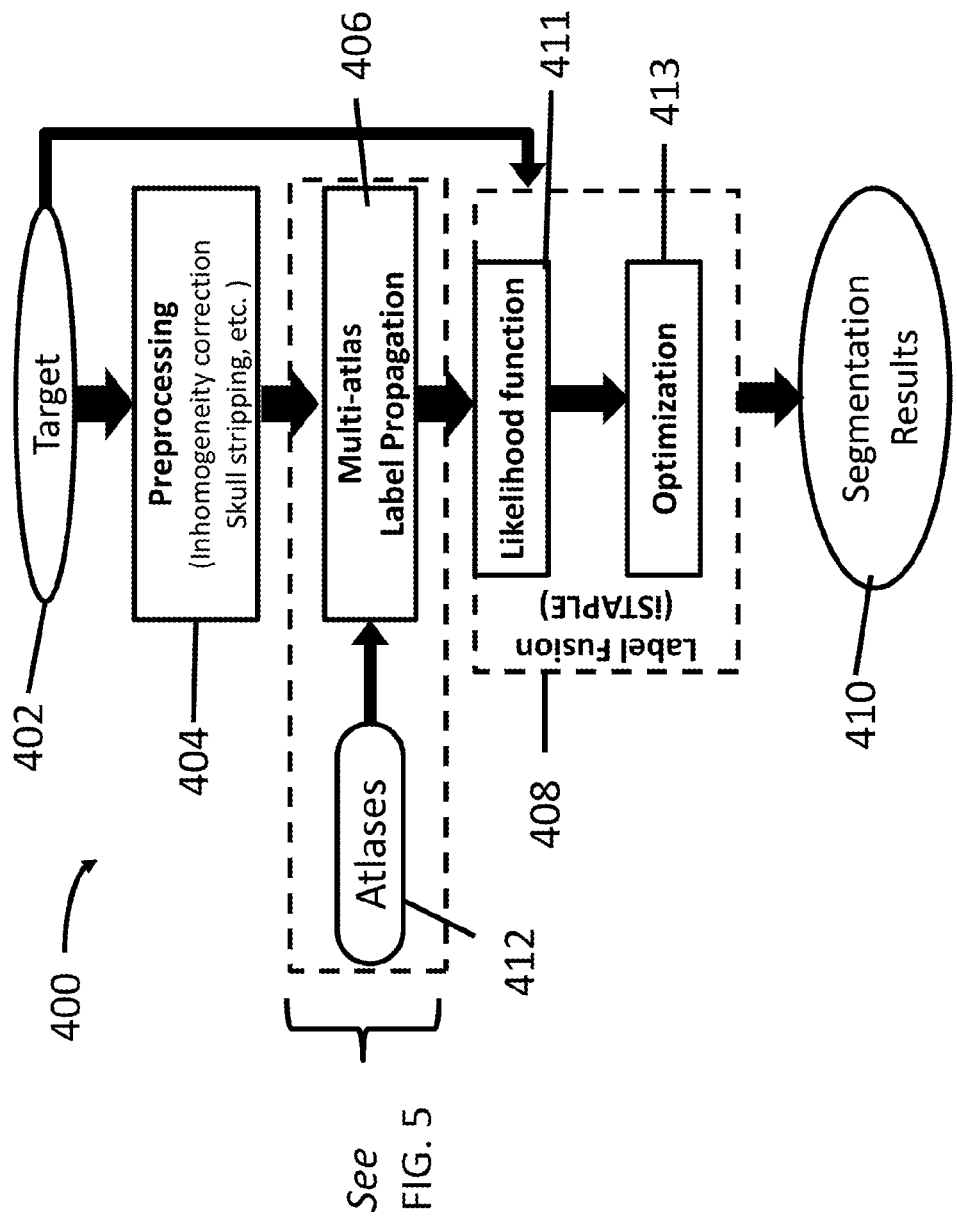
FIG. 4 is a schematic in one embodiment of iSTAPLE for atlas-based segmentation.

FIG. 4 is a schematic in one embodiment of the system 400 utilizing the method of label fusion with intensity distribution. The atlas-based segmentation system 400 utilizes a target image 402 that is refined through a preprocessing step 404. The preprocessing step may include an inhomogeneity correction, skull stripping, etc., as utilized to refine the target image 402. A set of atlases 412, each including an intensity image and a set of labels, proceeds through a multi-atlas label propagation step 406, to register to the pre-processed target image and propagate the sets of labels for the atlases 412. The label fusion process step 408 utilizes both the propagated sets of labels from multi-axis label propagation 406 and the target image 402, via iSTAPLE, to produce segmentation results 410.

Aspects of the invention utilize iSTAPLE to determine which label (of the multiple labels per each voxel of an image) is the most likely label. The method of iSTAPLE defines a likelihood function 411 that incorporates both anatomical knowledge of the structure spatial arrangement, by fitting anatomical maps onto the target image, in the form of propagated atlas label maps 406; and the structure appearance specific to the target image during optimization 413, in the form of intensity distribution functions for the structures to be segmented. This is different from conventional methods which do not consider structure appearance of a target image in the label fusion step.

For example, after the anatomical maps are fitted onto a labeled target image, multiple labels result at each voxel. Of all the labels, the likelihood function determines which is the most likely. The iSTAPLE label fusion step 408 identifies one label (the most likely label) per voxel on the segmentation map, while also taking structure appearance of the target image, including intensity distributions for each structure derived from the target image, into consideration.

In one aspect of iSTAPLE, performance level parameters are utilized in the likelihood function, which describes the labeling performances of different atlases. In another aspect, the label performance parameter for an atlas captures how well the atlas correctly labels the structures. In addition, iSTAPLE utilizes the intensity distributions for each structure derived from the target image. The distribution can be modeled using parametric models, for example, Gaussian model or mixtures of Gaussian model, or non-parametric models, for example kernel density estimation or Parzen window, among others. The likelihood function is then optimized 413 to segment the target image by computing the true label maps of the target image. This is performed using a modified expectation-maximization algorithm that simultaneously computes the optimal performance level parameters and the structure intensity distribution functions. Other optimization methods can be applied as well. Depending on the selected models for the structure intensity distribution, the determination of optimal distribution functions, or optimization 413, can be used to determine the model parameters. For exemplary purposes, and not limitation, the mean $\mu$ and variance $\sigma^2$ for a Gaussian model, or the probabilistic distribution function (pdf) when using the non-parametric model may be utilized. In one embodiment, Equation 7, as described herein, implements an EM algorithm using a Gaussian model. Other models may be utilized, however, as determined by the user.

Figure 5:
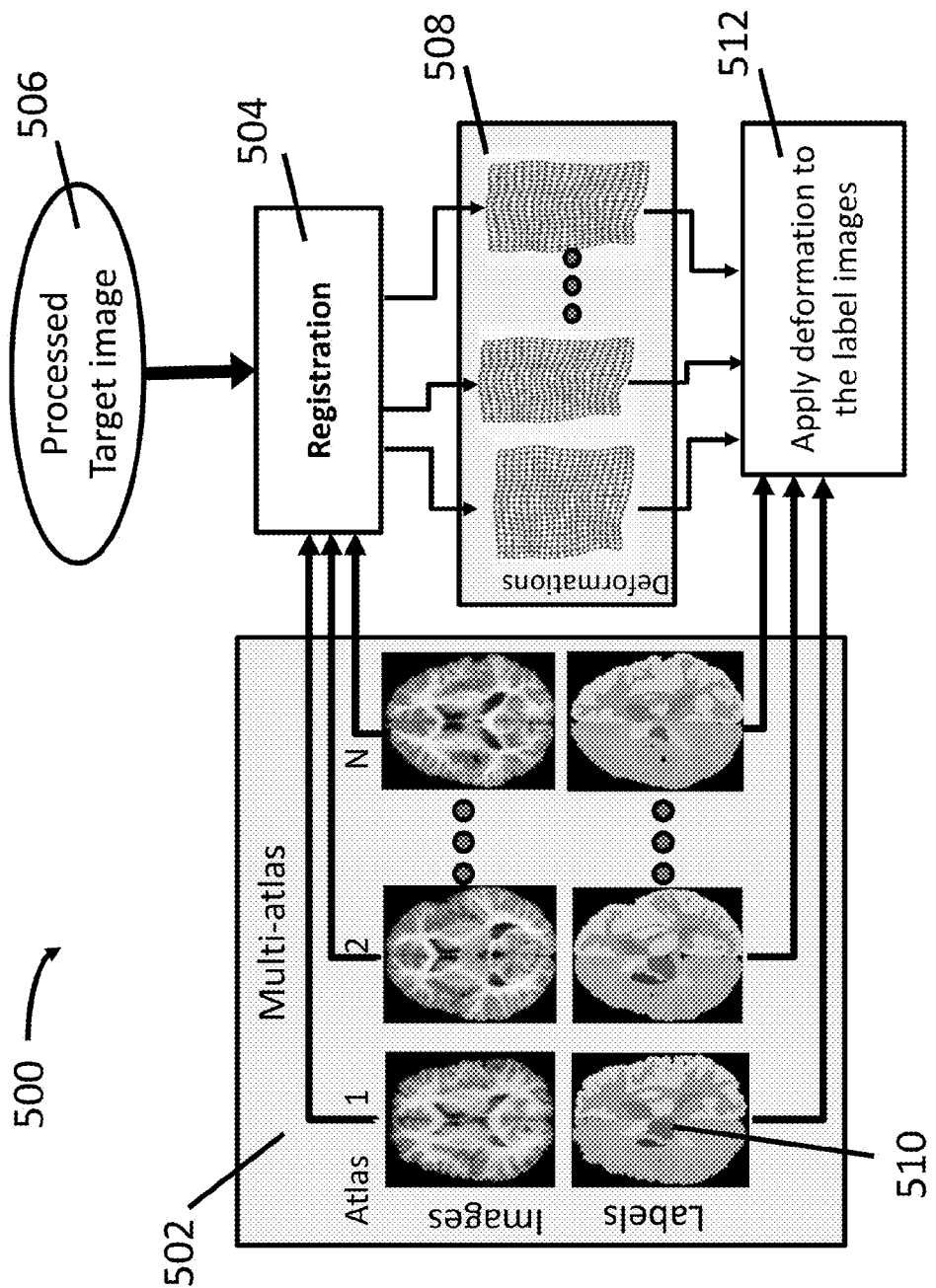
FIG. 5 illustrates one embodiment of multi-atlas based label propagation from FIG. 4.

FIG. 5 illustrates a schematic of a multi-atlas based label propagation 500 for whole brain segmentation, as utilized in the embodiment of the system 400. The multi-atlas images 502 are registered 504 with the processed target image 506 to produce deformations 508. The label images 510 are then integrated with the deformations 508 to produce results 512, where the deformations are applied to the label images. Such methodology may be applied to various anatomical structures, in partial or whole organ systems.

Various embodiments of the system have encompassed the use of the label fusion method, herein called iSTAPLE, to extend the STAPLE method by incorporating the target intensity image into the statistical formulation of STAPLE. By considering the different appearances of different structures, as well as taking advantage of statistical label fusion based on atlas consensus and performance level, iSTAPLE improves the label fusion results especially for structures with different appearance as their neighboring structures. Experiments performed on the brain segmentation on 18 IBSR datasets, and the demonstrated results, prove that iSTAPLE consistently outperforms the STAPLE method.

Thus, the method can be varied and utilized in the imaging of various biological and non-biological structures so as to encompass one or more aspects of the iSTAPLE and imaging intensities. As shown in FIG. 2, both iSTAPLE and STAPLE did not perform well on certain regions of the brain, e.g., white matter, mainly because image registration did not perform consistently on these regions for different atlas images, and the intensity weighting in iSTAPLE did not make the correction. Thus, in other embodiments, other image cues are incorporated to include boundaries and textures that include difficult imaging areas, including for example, white matter regions.

In the embodiments illustrated, the structure intensity distributions are modeled using Gaussian. Other parametric methods, such as the mixture of Gaussian model, and non-parametric methods, such as Parzen window or kernel density estimation method, may be utilized to model the distributions more accurately. Such methods may be implemented as designated by the user or as desired for particularly imaging techniques and the structures designated for imaging.

In various embodiments, the method may be applied to segment both normal and diseased structures. It should be appreciated that the various embodiments may be implemented with different structures or organs. For example, the results described herein show that various embodiments performed well particularly for brain. The various embodiments, however, can be readily extended to other applications, such as of atlas-based segmentation, e.g., prostate and heart.

It should be noted that although the various embodiments are described in connection with a multi-atlas approach, the various embodiments may be applied, for example, to probabilistic atlas approaches. It also should be noted that variations and modifications are contemplated, for example, to include other speed functions, including curvature-based terms for smoothness.

Accordingly, various embodiments provide image segmentation, wherein the resulting images may be used, for example, in medical diagnosis. The various embodiments may be implemented in connection with an MRI system which is used to acquire MRI data that is segmented to generate images as described herein. Thus, the MRI system may be utilized, for example, to implement the method described herein.

The various embodiments may be implemented in connection with different types of systems including a single modality imaging system and/or the various embodiments may be implemented in or with multi-modality imaging systems. The system is illustrated as an MRI imaging system and may be combined with different types of medical imaging systems, such as a Computed Tomography (CT), Positron Emission Tomography (PET), a Single Photon Emission Computed Tomography (SPECT), as well as an ultrasound system, or any other system capable of generating images, particularly of a human. Moreover, the various embodiments are not limited to medical imaging systems for imaging human subjects, but may include veterinary or non-medical systems for imaging non-human objects, luggage, etc.

It should be noted that the particular arrangement of components (e.g., the number, types, placement, or the like) of the illustrated embodiments may be modified in various alternate embodiments. In various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), a given module or unit may be added, or a given module or unit may be omitted.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "computer," "controller," and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A non-transitory computer readable storage medium for segmenting an image using a processor, the non-transitory computer readable storage medium including instructions to command the processor to:
   obtain a plurality of images, reserving at least one image as a target image, and using a remaining portion of the plurality of images as atlas images in a multi-atlas segmentation;
   provide at least one set of labels per atlas image within an image space of the atlas image;
   register the atlas images to the target image by way of computed transformations;
   propagate the sets of labels from the image spaces of the atlas images to an image space of the target image using the computed transformations to generate a propagated label map; and
   create a segmented target image by way of label fusion using intensity data of the target image and the propagated label map; wherein the segmented target image incorporates segmentation along structure boundaries; wherein the intensity data comprises intensity distributions for each structure derived from the target image.

2. The non-transitory computer readable storage medium of claim 1, wherein the step of creating the segmented target image comprises intensity-based simultaneous truth and performance level estimation (iSTAPLE).

3. The non-transitory computer readable medium of claim 2, wherein the step of creating the segmented target image utilizes a likelihood function in combination with an optimization of a cost function that combines one or more sets of the labels in the segmented target image with the intensity data from the target image.

4. The non-transitory computer readable medium of claim 3, wherein the instructions command the processor to perform an expectation-maximization (EM) algorithm to optimize the cost function.

5. The non-transitory computer readable medium of claim 4, wherein the expectation-maximization (EM) algorithm is performed iteratively.

6. The non-transitory computer readable storage medium of claim 1, wherein the plurality of images are weighted images by magnetic resonance (MR) contrast.

7. The non-transitory computer readable storage medium of claim 1, wherein the step of registering, the atlas images are overlaid on the target image to simultaneously generate a propagated label map.

8. The non-transitory computer readable storage medium of claim 7, wherein the step of registering comprises one or more classes of registration, including linear or non-linear, deformable, volume-based, and landmark-based registration, individually or in combination.

9. The non-transitory computer readable medium of claim 1, wherein the segmented target image comprises one or more structures having intensity distributions computed, and wherein the intensity distributions are utilized in said step to create said segmented target image.

10. The non-transitory computer readable medium of claim 9, wherein the intensity distributions are used to model differences between the one or more structures.

11. A system for image segmentation using target image intensity, the system comprising a processor and a storage medium combination under software control to determine a likelihood function for intensity-based simultaneous truth and performance level estimation (iSTAPLE), wherein the processor compensates for anatomical variation during image segmentation and thereby integrates structure appearance information from a target image; and anatomical maps fitted onto a labeled target image during multi-atlas propagation;
   wherein said structure appearance information includes target image intensity to identify one label per voxel in a resulting segmentation map; wherein the structure appearance information incorporates segmentation along structure boundaries;
wherein the target intensity comprises intensity distributions for each structure derived from the target image.

12. The system of claim 11, wherein the target image is selected for brain segmentation.

13. The system of claim 11, wherein the target image comprises one or more anatomical structures internal to a mammalian body.

* * * * *